Sept. 16, 1969     G. HUBERT     3,467,825
SIGNATURE VERIFICATION SYSTEM
Filed March 25, 1968     2 Sheets-Sheet 1
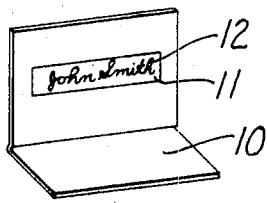
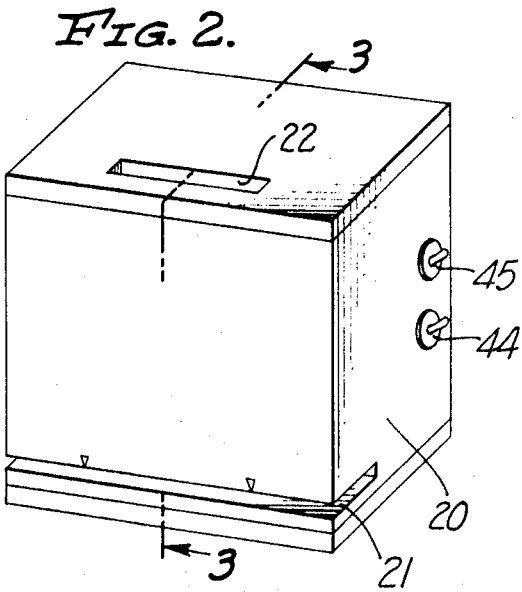
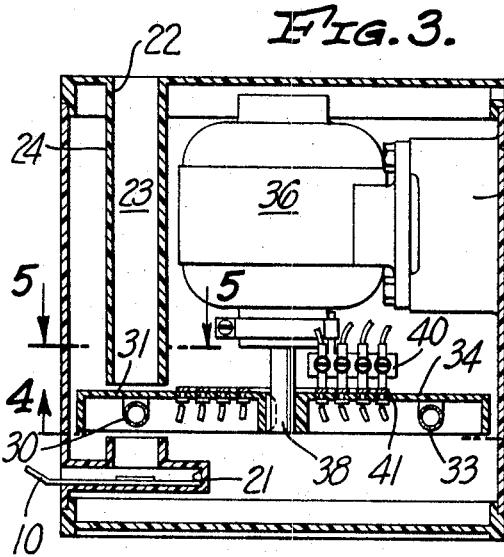
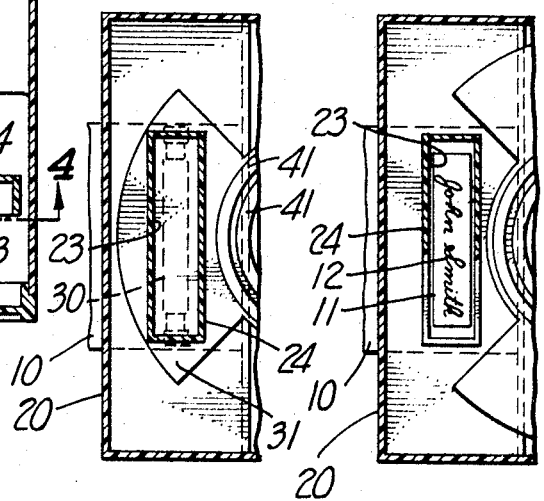
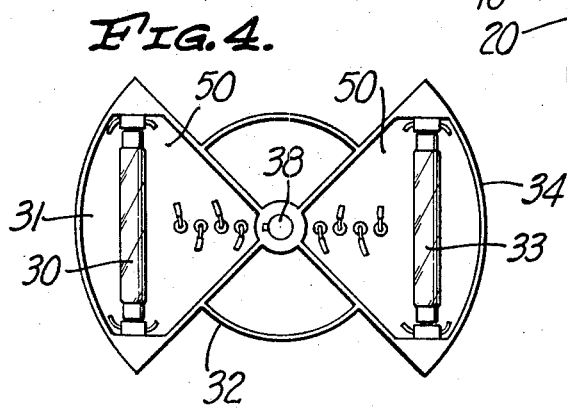
INVENTOR
GUSTAV HUBERT
BY HIS ATTORNEYS
HARRIS, KIECH, RUSSELL & KERN Sept. 16, 1969 G. HUBERT 3,467,825
SIGNATURE VERIFICATION SYSTEM
Filed March 25, 1968 2 Sheets-Sheet 2
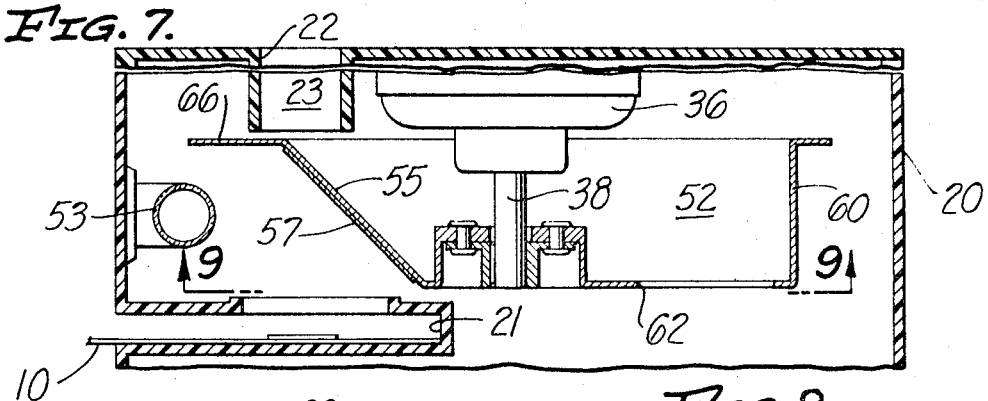
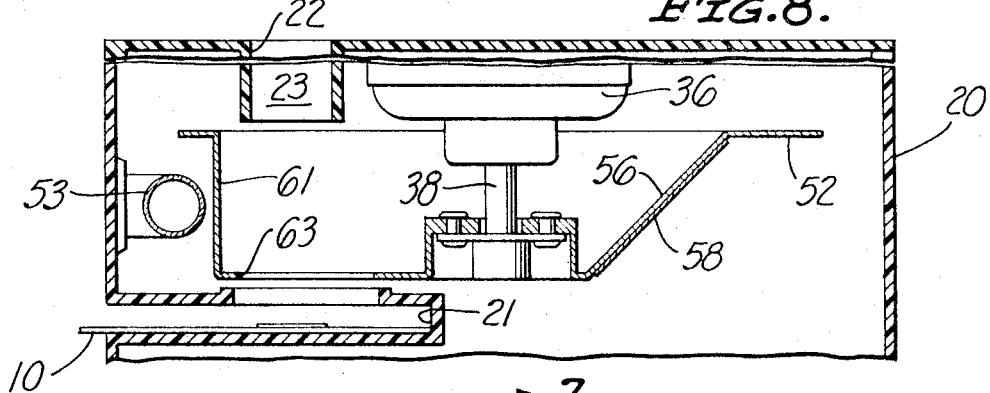
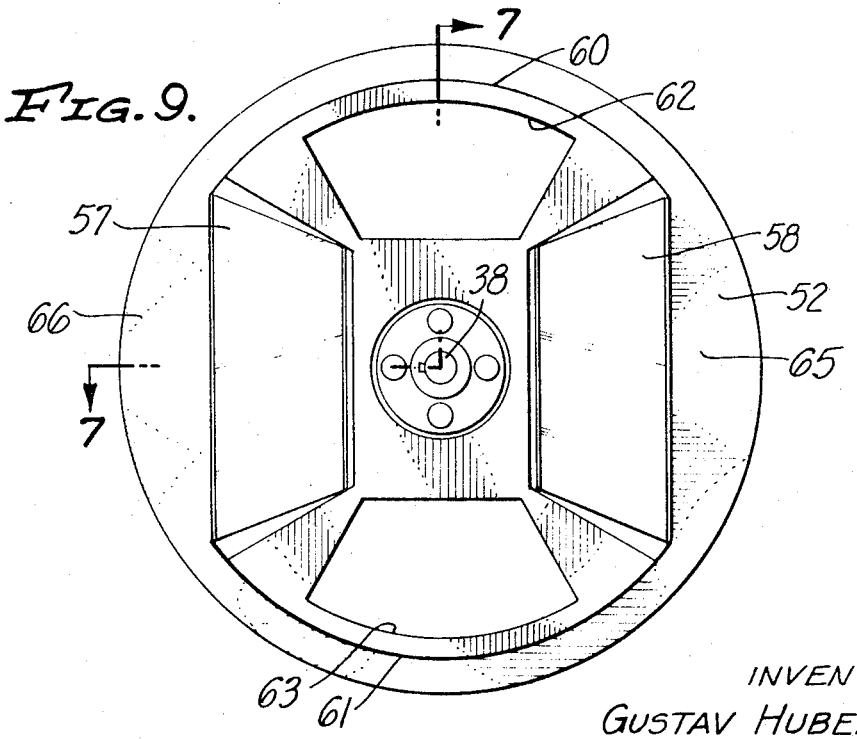
INVENTOR
GUSTAV HUBERT
BY HIS ATTORNEYS
HARRIS, KIECH, RUSSELL & KERN United States Patent Office 3,467,825
Patented Sept. 16, 1969

3,467,825
SIGNATURE VERIFICATION SYSTEM
Gustav Hubert, San Gabriel, Calif., assignor to Ultra-Violet Products, Inc., San Gabriel, Calif., a corporation of California
Filed Mar. 25, 1968, Ser. No. 715, 871
Int. Cl. G01d 7/06
U.S. Cl. 250—78               10 Claims

ABSTRACT OF THE DISCLOSURE

Apparatus for verifying indicia, such as signatures in a savings account passbook or on a credit card. A passbook with a layer of fluorescent material and a signature in phosphorescent material, with the two materials being indistinguishable in daylight. Means for periodically illuminating the passbook with ultraviolet, which the phosphorescent signature glow being visible between periods of illumination.

---

This invention relates to indicia verification systems and will be described as applied to a system for verifying signatures in savings account passbooks. Of course, it will be recognized that the invention is not limited to signatures as indicia nor passbooks as carriers, but is equally applicable to various indicia applied to various carriers. A typical example of another use is signatures or codes on credit cards.

In a system currently in use, a passbook holder signs his name by laying a small strip of transfer paper onto the book and signing over the strip. The small strip of paper is essentially a piece of carbon paper, which carries a fluorescent material rather than a black material for transfer to the passbook. The signature may be applied in a signature space or directly over printed material or otherwise as desired. The signature is relatively invisible when viewed in daylight but is readily seen when viewed under ultraviolet. The fluorescent material comprising the signature does have a somewhat off-white appearance and usually can be discerned when viewed in daylight at particular angles.

Signature verification systems of this type have not been one hundred percent satisfactory because the signature can be seen in daylight and because ultraviolet lamps are readily available to an unscrupulous person who might be inclined to duplicate the signature or other indicia.

Accordingly, it is an object of the present invention to provide a new and improved signature verification system wherein the signature can be made completely indistinguishable both in daylight and in ultraviolet light. A further object is to provide such a system which requires no more work on the part of the signer or the verifier than the presently used systems and one which involves very little more expense.

The present invention utilizes a layer of a fluorescent material on the passbook, with the signature being applied in a phosphorescent material. The two materials are selected to have the same appearance under daylight so that the signature cannot be detected under ordinary viewing conditions. When the passbook is exposed to ultraviolet, the radiation from the fluorescent material completely masks the radiation from the signature phosphorescent material. The phosphorescent signature is viewed by periodically exciting the materials with ultraviolet and then viewing the passbook after the ultraviolet is removed, with the phosphorescent glow making the signature readily visible. The duration of phosphorescent glow can be made quite short and the rate of exposure to ultraviolet illumination can be made quite high. Then when the passbook is exposed to the proper illuminating means, the signature is visually constant, while exposure to other types of illumination produces no information.

The invention also comprises novel details of construction and novel combinations and arrangements of parts, which will more fully appear in the course of the following description. The drawings merely show and the description merely describes preferred embodiments of the present invention which is given by way of illustration or example.

In the drawings:

FIGURE 1 illustrates a typical passbook incorporating a preferred embodiment of the invention;

FIGURE 2 is an isometric view of one form of a passbook illuminating device;

FIGURE 3 is a sectional view taken along the line 3—3 of FIGURE 2;

FIGURE 4 is a partial sectional veiw taken along the line 4—4 of FIGURE 3;

FIGURE 5 is a partial sectional view taken along the line 5—5 of FIGURE 3 showing the mechanism in the illumination position;

FIGURE 6 is a view similar to that of FIGURE 5 showing the mechanism in the viewing position;

FIGURE 7 is a partial sectional view of an alternative form of passbook illuminating device, shown in the illumination position;

FIGURE 8 is a view similar to that of FIGURE 7 showing the mechanism in the viewing position; and FIGURE 9 is a bottom view of the wheel of FIGURES 7 and 8.

Referring to the passbook 10 of FIGURE 1, a layer 11 of fluorescent material is applied to a portion of the book. The layer 11 may be applied directly to the passbook or may be applied to a piece of paper which is in turn attached to the passbook. The layer may cover an entire sheet or only a limited area, as indicated by the rectangle 11 in FIGURE 1.

A signature 12 is then applied on the layer 11 in the conventional manner, with the signature formed of a phosphorescent material. The signature 12 can be applied by writing with a phosphorescent ink or by use of a transfer paper coated with a phosphorescent material. The signature may be covered with a transparent adhesive tape for protection, if desired.

A fluorescent material, as the expression is used herein, is a material which radiates visible light when illuminated or excited by light in the ultraviolet range. A phosphorescent material, as the expression is used herein, is a material which radiates visible light when excited by ultraviolet and which continues to radiate for a period of time after the ultraviolet excitation is terminated. A typical fluorescent material is Radiant Color Co. Velva-Glo pigment R–103–G green. A typical phosphorescent material is U.S. Radium #2210, zinc sulfide phosphor. Preferably, theses materials are selected to have the same visual appearance in daylight, so that the phosphorescent signature is indistinguishable from the fluorescent layer.

One form of illuminating apparatus is shown in FIGURES 2-6 and includes a housing 20 with a passbook receiving slot 21 and a viewing slot 22. A viewing passage 23 may be provided within the housing between thhe viewing slot 22 and the passbook slot 21, and is illustrated in FIGURE 3 as a tube 24 of rectangular cross-section.

A lamp 30 is mounted in quadrant 31 of a wheel 32, and another lamp 33 is mounted in an opposite quadrant 34 of the wheel. An electric motor 36 is mounted in the housing 20 on a base 37, and the wheel 32 is mounted on the motor shaft 38 for rotating the wheel and lamps through the viewing passage 23 between the slots 22, 21. Electric power for the lamps 30, 33 is supplied to the wheel via a plurality of brushes 40 mounted in the housing and engaging corresponding conductor rings 41 carried on the wheel 32. A switch 44 provides for turning on power to the lamps 30, 33 and another switch 45 provides for turning on power to the motor 36. The lamps 30, 33 are selected to provide an output of a wave length for exciting the fluorescent and phosphorescent materials used on the passbook. Typically these are long wave ultraviolet lamps of conventional design. Of course, only a single lamp is required but the dual lamp construction illustrated in the drawing provides a balanced rotating wheel design.

In operation, the lamps and motor are turned on and a passbook is inserted in the slot 21, as illustrated in FIGURE 3. As the wheel 32 rotates, a lamp is periodically positioned above the passbook as illustrated in FIGURES 3 and 5. The upper portions 50 of the wheel quadrants 31, 34, serve as shields between the lamps and the viewing slot 22. When the wheel rotates 90° from the position of FIGURES 3 and 5 to the position of FIGURE 6, the passbook is exposed at the viewing passage 23 and the lamps are substantially blocked off from the viewing passage.

When a lamp is in the position of FIGURE 5, the passbook is being excited by a lamp and both the fluorescent material and the phosphorescent material are radiating. However, this is not seen by the viewer at the slot 22. When the passbook is exposed to the viewer, as illustrated in FIGURE 6, the materials are not being excited by the lamps and only the phosphorescent material is radiating and the signature is readily visible to the viewer. The wheel 32 is rotated at a relatively high rate, typically in the order of 600 r.p.m. and the viewer has the sensation of seeing the signature continuously. If the passbook is exposed to ultraviolet and viewed at the same time, the simultaneous radiation from the fluorescent material and the phosphorescent material completely masks the signature. Hence, the signature can be inspected only by providing the periodic illumination such as described in conjunction with the device illustrated. While the periodic illumination can be carried out in daylight, it is preferred to provide a viewing slot and passage substantially enclosed to reduce the stray light and improve the brightness of the phosphorescent image.

In the preferred arrangement, the phosphorescent signature 12 is applied over the fluorescent layer 11. The same result can be achieved by applying the fluorescent layer 11 over the signature 12, so long as the fluorescent layer is not so opaque as to block the ultraviolet excitation and the visible radiation. Also, a negative presentation can be obtained by making the layer 11 of phosphorescent material and the signature 12 of fluorescent material, with either on top.

In the alternative form of illuminating device illustrated in FIGURES 7, 8 and 9, elements corresponding to those of FIGURES 1–6 are identified by the same reference numerals. A wheel 52 is mounted on the shaft 38 of the motor 36 and a lamp 53 is mounted on an inner wall of the housing 20, as illustrated in FIGURES 7 and 8. The lamp 53 may be similar to the lamps 30, 33. The wheel 52 has two opposed sloping walls 55, 56, with a reflecting surface 57, 58 on the exterior of each sloping wall. The reflecting surfaces 57, 58 may comprise mirrors, or polished metal plates, or deposited metal films on the wheel structure, or other suitable devices. The wheel also has opposed rim portions 60, 61 and adjacent openings 62, 63.

The operation of the device of FIGURES 7–9 is substantially the same as the device of FIGURES 2–6. The lamp 53 is turned on and the wheel 52 is driven in rotation by the motor 36. When the wheel is in the position of FIGURE 7, radiation from the lamp is reflected onto the passbook 10 and the fluorescent and phosphorescent materials. When the wheel is in the position of FIGURE 8, radiation from the lamp is blocked from the passbook 10 and from the viewing passage by the rim 61. At the same time, the passbook is visible through the opening 63 of the wheel and the viewing passage 23. The wheel 52 preferably has flanges 65, 66 which block the lamp radiations from the viewing passage while the passbook is being excited. Thus, it is seen that the illuminating device provides for sequentially exciting the passbook with appropriate radiation, and exposing the passbook to view, while blocking the radiation from the viewer at all times.

Various other mechanisms can be utilized for providing the periodic illumination. A typical alternative structure incorporates a reciprocating element in place of the rotating wheel. It will be understood that other applications of the invention are possible and that the embodiments disclosed may be subjected to various changes, modifications and substitutions without necessarily departing from the spirit of the invention.

I claim:

1. In an indicia verification system utilizing fluorescent and phosphorescent materials, the combination of:
   a carrier;
   a continuous and substantially uniform layer of one of said materials in a zone on said carrier;
   an indicia in the other of said materials on said carrier in the zone of said layer; and
   means for periodically illuminating said layer with light of a wave length for exciting said materials.

2. A system as defined in claim 1 in which said layer is of fluorescent material and said indicia is of phosphorescent material.

3. A system as defined in claim 1 in which said layer is of phosphorescent material and said indicia is of fluorescent material.

4. A system as defined in claim 1 in which said indicia is on said layer.

5. A system as defined in claim 1 in which said layer is over said indicia.

6. A system as defined in claim 1 in which said illuminating means includes:
   a housing having means defining a carrier viewing path with an aperture substantially the size of said indicia;
   a continuously energized lamp for producing light of a wave length for exciting said materials; and
   means for simultaneously blocking said viewing path and illuminating a carrier at one end thereof, and then blocking illumination of said lamp from said path and permitting viewing of a carrier at said end, and including
   a rotating shield moving through said path and carrying a reflecting surface for directing lamp illumination to the carrier,
   said shield including means defining open areas preceding and following said reflecting surface with opaque barriers between said open areas and said surface blocking lamp illumination from said carrier and said aperture, whereby the entire indicia may be viewed through an open area at one time.

7. A method of verifying indicia on a carrier utilizing fluorescent and phosphorescent materials, including the steps of:
   applying the indicia in one of said materials and a continuous and substantially uniform layer of the other of said materials to the carrier in overlying relation;
   periodically exposing the carrier to a light of a wave length for exciting the phosphorescent and fluorescent materials; and
   viewing the carrier between such periods of exposure.

8. A method of preparing verifiable indicia on a carrier utilizing fluorescent and phosphorescent materials, including the steps of:
   applying a continuous and substantially uniform layer of one of said materials onto the carrier in a zone; and applying an indicia in the other of said materials in a desired pattern onto the carrier in the zone of said layer.

9. In an indicia verification system utilizing fluorescent and phosphorescent materials, a carrier, a layer of one of said materials in a zone on the carrier, and an indicia in the other of said materials on the carrier in the zone of said layer, the improvement in means for periodically illuminating said layer with light of a wave length for exciting said materials comprising in combination:
a housing having means defining a carrier viewing path;
a lamp for producing light of a wave length for exciting said materials; and
means for mounting said lamp in said housing for movement between a first position for blocking said path and illuminating a carrier at one end thereof, and a second position for blocking said lamp from said path and permitting viewing of a carrier at said end.

10. A system as defined in claim 9 including a motor for rotating said lamp mounting means to move said lamp through said path, said mounting means including a shield for blocking light from said lamp along one direction of said path.

References Cited
UNITED STATES PATENTS

| | | | |
|---|---|---|---|
| 2,459,693 | 1/1949 | Gordon | 250—71 |
| 2,975,966 | 3/1961 | Howard | 250—71 X |

RALPH G. NILSON, Primary Examiner

D. L. WILLIS, Assistant Examiner

U.S. Cl. X.R.

250—71; 283—7